United States Patent [19]

Chambers

[11] Patent Number: 4,760,678

[45] Date of Patent: Aug. 2, 1988

[54] ANCHORING DEVICE

[75] Inventor: John T. Chambers, Redditch, England

[73] Assignee: Baker & Finnemore Limited, Birmingham, England

[21] Appl. No.: 25,613

[22] Filed: Mar. 13, 1987

[30] Foreign Application Priority Data

Mar. 15, 1986 [GB] United Kingdom ............... 8606431
Aug. 20, 1986 [GB] United Kingdom ............... 8620208

[51] Int. Cl.⁴ ............................................. F16B 13/06
[52] U.S. Cl. ........................................ 52/562; 52/585;
                                                 52/698; 411/21
[58] Field of Search ................. 52/698, 704, 585, 586,
     52/562; 411/21-24, 25, 75, 76, 32, 33, 57;
                                          403/368, 369, 297

[56] References Cited

U.S. PATENT DOCUMENTS

| | | | |
|---|---|---|---|
| 2,102,999 | 12/1937 | DeVries | 411/57 |
| 3,269,251 | 8/1966 | Bass | 411/21 |
| 3,319,209 | 5/1967 | Reyenga | 411/21 |
| 3,405,592 | 10/1968 | Blodee | 52/585 |
| 3,942,329 | 3/1976 | Babcock | 52/698 |
| 4,112,637 | 9/1978 | Herbst | 52/704 |
| 4,270,434 | 6/1981 | Bucheli | 411/21 |
| 4,309,911 | 1/1982 | McCall | 73/862.53 |

FOREIGN PATENT DOCUMENTS

| | | | |
|---|---|---|---|
| 3017108 | 11/1981 | Fed. Rep. of Germany | 411/21 |
| 1350749 | 4/1974 | United Kingdom | 52/704 |
| 0975940 | 11/1982 | U.S.S.R. | 52/585 |

Primary Examiner—John E. Murtagh
Attorney, Agent, or Firm—Leydig, Voit & Mayer

[57] ABSTRACT

An anchoring device comprises an elongate tubular body, a plunger axially movable in the bore of the body to operate gripping means in the form of transverse dog plates which axial movement of the plunger causes to project through openings in the body to engage the surface of a hole drilled in a structure to which the device is to be secured.

The anchoring device may be a wall tie with gripping means at each end to engage co-axial holes in two leaves of a cavity wall. Alternatively one or each gripping means may be replaced by a waisted, windowed portion of the wall of the body to be secured in the hole by synthetic resin. Means may be provided for connecting a grip-testing device to the wall tie and a modification allows the grip of one gripping means to be tested before the other is operated.

24 Claims, 3 Drawing Sheets

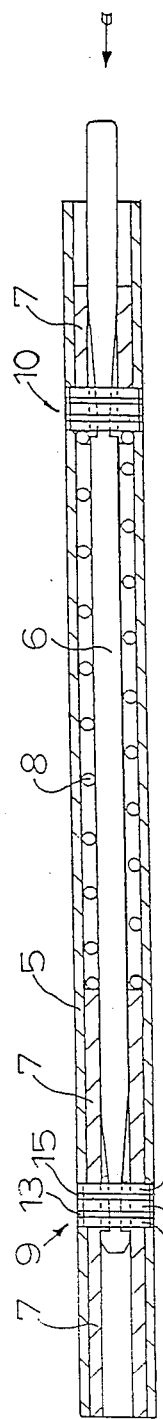
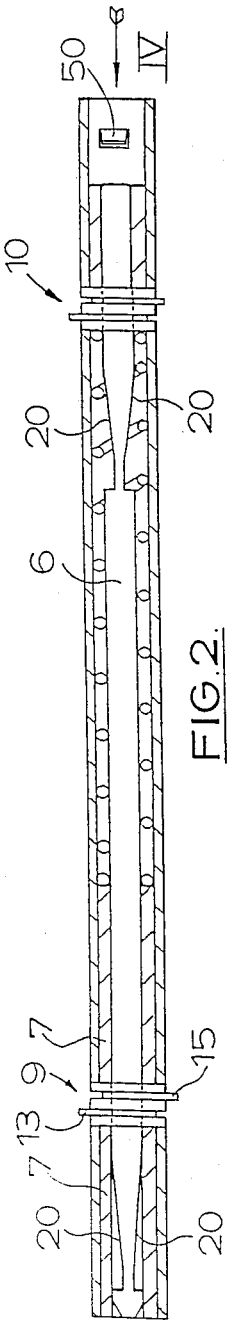
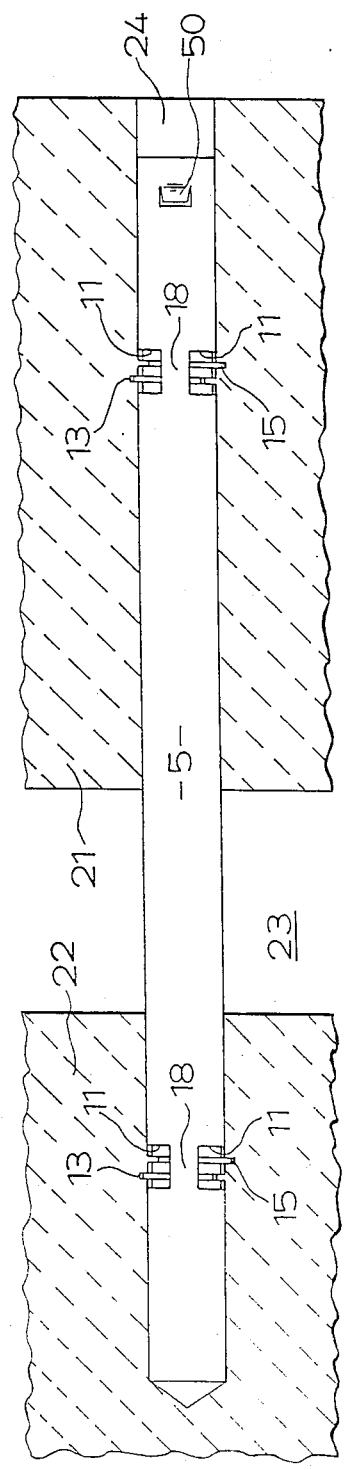
FIG.1.
FIG.2.
FIG.3.

ANCHORING DEVICE

This invention relates to an anchoring device for providing a fixing in a wall floor or other structure and particularly, though not exclusively, to a wall tie for connecting the inner and outer leaves of cavity walls of buildings.

Wall ties embedded in the mortar courses are incorporated during the building of brick or block cavity walls. In many older buildings the original wall ties to steel have been weakened by rusting to such an extent that they have broken or are dangerously weak. Replacement is necessary. It is possible by removing bricks to replace old wall ties by new ties similarly embedded in mortar but this is a very laborious and time consuming process.

Many proposals for fitting remedial wall-ties have been made in which a circular hole is drilled through one leaf, usually the outer leaf, and partway through the other leaf, usually the inner leaf. Various forms of replacement ties to be fitted in such holes have been proposed. Some involve the use of synthetic resin to secure the tie or a nut element in at least one leaf of the wall. A delay is involved while the resin sets before the fixing of the tie can be completed as torque cannot be applied until the resin has set. Other replacement ties are of complex construction and high cost usually involving expansible portions for securing the tie in the inner and outer leaves.

An object of the present invention is to provide an anchoring device which is simple and inexpensive to make and quick and easy to fit and, in its application to a remedial wall tie, is an improvement in some, at least, of these respects on replacement wall ties so far available.

The present invention consists in an anchoring device adapted to be fitted in a hole drilled in a structure to which the device is to be secured comprising an elongate tubular body, gripping means, a plunger axially movable in the bore of the tubular body and operably connected to the gripping means, the arrangement being such that, in use, after fitting the anchoring device in the hole, axial movement of the plunger causes the gripping means to project laterally from the wall of the tubular body to grip the surface of the hole.

Preferably the gripping means is operable by inward movement of the plunger. The plunger can then be driven inwards from an exposed outer end of the tubular body, with, if necessary, the aid of a drift or punch.

The gripping means of an anchoring device according to the present invention may comprise transverse dogs disposed in openings in the wall of the tubular body. The plunger may be operably connected to the gripping means by having at least one inclined portion engageable with the dogs.

According to this aspect the present invention consists in an anchoring device adapted to be fitted in a hole drilled in a structure to which the device is to be secured comprising an elongate tubular body, a plunger axially movable in the bore of the tubular body and having at least one inclined portion engageable with gripping means comprising transverse dogs disposed in openings in the wall of the tubular body, the arrangement being such that, in use, after fitting the anchoring device in the hole axial movement of the plunger causes the dogs to project through the openings in the wall of the tubular body to grip the surface of the hole.

In the retracted condition of the anchoring device the dogs can be withdrawn within the outer surface of the tubular body and the outer end of the plunger preferably projects beyonds the outer end of the tubular body so as to be accessible for driving inwards, by a hammer, for example, to secure the device in the hole. Alternatively the outer end of the plunger may lie inside the bore of the tubular body for at least a part of its travel and be driven inwards with the aid of a drift, punch or other tool.

The dogs may be small metal plates sandwiched between metal guide plates of which at least the outer ones are supported in the openings, for example, by the edges of the wall of the tubular body exposed at the openings. Both the dog plates and the guide plates have apertures to allow the plunger to pass through. Those in the dog plates are eccentric. When the plunger is driven axially inwards the dog plates are moved transversely by engagement of the inclined portion or portions with the edges of the apertures in the dog plates to cause the operative part of the dog to project beyond the tubular body. Preferably there are inclined portions on opposite sides of the plunger which is thus of tapered form in this region. With each inclined portion at least one of the dog plates is associated and is arranged on axial movement of the plunger to be caused to project through one of the openings towards which the inclined portion faces.

An anchoring device according to the invention, as a fixing device, may have one or more sets of opposed dogs and the tubular body be adapted to project from the hole in which it is set and be provided with screw threaded or other means of attachment of an article to be secured by the anchoring device.

In the application of the invention to remedial wall ties, gripping means may be provided at each end of the tubular body to secure the wall tie in aligned holes in the two leaves of the cavity wall. Both the gripping means may be operable by a single plunger. When the gripping means comprises dogs operated by inclined portions of the plunger as previously described, the anchoring device may have axially spaced inclined portions of the plunger and associated sets of dogs to engage the two leaves of the wall, the arrangement being such that all the dogs are caused to project simultaneously and similarly upon axial inward movement of the plunger.

The outer end of the tubular body may be provided with means for releasably connecting a testing device for testing the grip of the anchoring device in the structure on an adaptor for coupling such a testing device to the anchoring device. Sometimes there is a requirement to test that the wall tie has been satisfactorily anchored to one leaf before the wall tie is secured to the other leaf. To meet such a requirement the gripping means may be operable by separate plungers, so that the gripping means can be operated independently. The plungers may be co-axial, only the plunger for the inner gripping means being assembled in the tubular body on initial insertion in the hole. The inner plunger can be operated by a drift from the exposed end of the tubular body. The grip of the inner gripping means can then be tested. If the test is satisfactory the second plunger is assembled and operated to cause the outer gripping means to grip the surface of the hole in the other leaf.

Testing devices for remedial wall ties are usually provided with an internally screw-threaded socket to engage 6 mm screw-threaded ends of wall ties of the rod-type. To enable the grip of wall ties according to the present invention to be tested by standard equipment, an adaptor may be provided having a 6 mm screw-threaded shank and a spigot, the diameter of which fits easily into the bore of the tubular body of the wall tie. Interengaging formations may be provided on the spigot and the tubular body engageable on insertion of the head in the bore of the tubular body. For example, the spigot may be inserted axially and then turned to cause the formations to interengage. The adaptor is secured to the wall tie by the interengaging formations and the testing device is connected to the adaptor by the screw-threaded shank.

One suitable form of the interengaging formations is a bayonet joint, bayonet slots being provided at the outer end of the tubular body to receive radial pins projecting from the spigot of the adaptor.

In another example, projections extending inwardly into the bore of the tubular body are engaged by a spigot the free end of which forms a head the full diameter of which suits the bore of the tubular body. The head has gaps which allow it to pass the projections. Then by turning the adaptor in the bore of the tubular body the head is engaged behind the projections.

In some buildings one leaf of a cavity wall is made of breeze block or similar material which is softer than brick or concrete used for the other leaf. The gripper means of the present invention may not grip satisfactorily in softer materials and resin affords a better connection to the wall material.

In a modified anchoring device according to the invention intended as a wall-tie for use in such circumstances the gripping means in the portion of the tube lying within the softer material is omitted and replaced by formations affording a satisfactory key between the resin and the wall tie while the portion of the tube lying within the harder material is secured by gripper means as previously described.

Such a wall-tie does not suffer the disadvantage of previous wall-ties partly secured by resin in which the resin must be allowed to set before torque can be applied to tighten the expansible part of the wall-tie. To tighten an anchoring device according to the invention only axial movement of the plunger is necessary. Tightening of the said modified anchoring device can be effected before the resin has set, making another visit to the site for this purpose unnecessary. The resin may be injected into the hole before the wall-tie is inserted or it may be supplied in a frangible capsule provided within the tube, the capsule being broken by the plunger when driven into the tube. Alternatively the capsule may project from the inner end of the tube and be broken by contact with the blind end of the hole when the tube is inserted.

The formations may be holes, or preferably longitudinal slots pierced through the wall of the tubular body. In one preferred form, the formations comprise angularly spaced, narrow longitudinal strips separated by rectangular slots forming windows through the tubular body, the strips being bowed inwards to form a waisted portion of the tubular body.

According to this aspect the present invention comprises an anchoring device adapted to be fitted in a hole drilled in a structure to which the device is to be secured comprising an elongate tubular body including a windowed portion having apertures through the material of the tubular body, the windowed portion being contracted radially to form a waisted portion of the tubular body, the arrangement being such that in use, on fitting the anchoring device in the hole substantial local clearance is left between the windowed portion and the surface of the hole for synthetic resin used to secure the device in the hole in the structure.

The windowed portion preferably comprises angularly spaced, narrow longitudinal strips separated by slots forming windows, the strips being bowed radially inwards to form the waisted portion.

A wall tie having such a windowed portion to secure the tie in one leaf of the wall by the use of synthetic resin may be combined with suitable mechanical gripping means to secure the wall tie in the other leaf. Alternatively such windowed portions may be provided at both ends of the wall tie which is then secured to both leaves of the wall by the use of synthetic resin.

Anchoring devices of any of the various forms described herein, and similar to wall ties in having gripping means or formations at opposite ends, may be used to secure together structural components, for example cladding to the face of a building, by drilling aligned holes to receive the anchoring devices in both materials.

Embodiments of the invention will now be described, by way of example only, with reference to the accompanying drawings in which:

FIG. 1 is a longitudinal section of an anchoring device according to the invention in the form of a remedial wall tie and shown in a pre-operative condition;

FIG. 2 is a similar view in an operative condition;

FIG. 3 is a vertical section through a cavity wall of a building fitted with the wall tie of FIGS. 1 and 2 and showing the external view of the wall tie in the operative condition.

Figure 4:
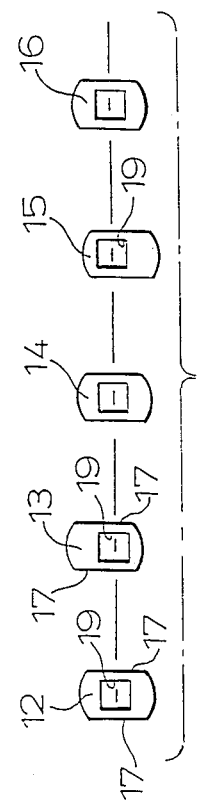
FIG. 4 is an exploded view of a sub-assembly of components of the wall tie of the previous Figures, showing each component as viewed in the direction of the arrow IV in FIG. 1.

The wall tie shown in FIGS. 1 to 4 comprises a tubular body 5, a plunger 6, three guide tubes 7, a compression spring 8 and two gripper sub-assemblies 9, 10. All these components are of stainless steel, though they could be made of other materials of adequate strength and either inherently corrosion resistant or protected against corrosion.

The tubular body 5 is made from tube of circular cross-section, though tubing of other cross-section could be used. Two diametrically opposed pairs of arcuate, parallel sided openings 11 (see FIG. 3) are cut through the wall of the tubular body 5 to receive the gripper sub-assemblies 9, 10. Each of the sub-assemblies 9, 10, is made up of the five plates 12, 13, 14, 15, 16, shown in FIG. 4. All the plates 12 to 16 as shown in FIG. 4 have the same external dimensions and the shape of a notional circular disc from which segments have been removed to form a pair of straight, parallel edges 17 spaced apart to fit freely between diametrically opposed bridging portions 18 of the wall of the tubular body 5 separating the openings 11 of each pair of openings. The plates 12 to 16 all have similar square apertures 19 two opposite sides of which are parallel to the edges 17. The aperturs 19 of the plates 12, 14 and 16, which are guide plates, are central between the curved ends but those in the plate 13 and 15, which are dog plates, are eccentrically disposed. The guide plates 12, 14 and 16 are slightly thicker than the dog plates 13, 15. The plates 12 to 16 are assembled face to face in the order indicated in FIG. 4 and with the longer portions of the dog plates 13 and 15 extending in opposite directions. The sub-assembly of plates 12 to 16 is inserted into one of the pairs of openings 11, the combined thicknesses of the plates being a free sliding fit between the arcuate parallel sides of the openings 11. The sub-assembly is supported in position across the tubular body 5 by the engagement of the ends of the plates 12 and 16 with the arcuate edges of the openings 11.

The plunger 6 is made from rectangular-section bar which is a free sliding fit in the apertures 19 of the plates. It is supported centrally in the tubular body 5 by the guide tubes 7 which fit freely in the bore of the tubular body 5 and have internal diameters affording clearance on the diagonal dimension of the square cross-section of the plunger 6 so that the plunger is free to move axially therein. Two of the guide tubes 7 abut opposite sides of the gripper sub-assembly 9, that between the two gripper sub-assemblies being held in place by the compression spring 8. Instead of the spring 8 a length of tubing of metal, plastics or other material could be provided. The third guide tube 7 abuts the outer face of the gripper sub-assembly 10 and extends to the end of the tubular body 5.

Two axially spaced pairs of inclined portions 20 are formed on opposite faces of the plunger, forming wedge-shaped or tapering regions on the plunger corresponding in spacing to that of the openings 11 housing the gripper sub-assemblies 9 and 10. The plunger 6 is inserted through the guide tubes 7 and the apertures 19 of the plates 12 to 16 with the inclined portions 20 facing in the direction of the openings 11. FIG. 1 shows the position the plunger 6 occupies prior to installation of the wall tie. The rear end of the plunger 6 projects from the end of the tubular body 5. The plates 12 to 16 are free to move, laterally in this position of the plunger and to prevent their projecting from the openings 11 during installation they may be covered by a band of adhesive tape.

At the outer end of the tubular body 5 a diametrically opposed pair of inwardly projecting lugs 50 is provided for testing purposes which will be described in more detail later.

To install the device a hole, of a diameter to receive the tubular body 5, is drilled through an outer leaf 21 (FIG. 3) of a cavity wall and part way through an inner leaf 22. The leaves 21 and 22 are separated by a cavity 23. The hole is drilled deeper than the length of the tubular body 5. The wall tie is pushed as far as it will go into the hole leaving an outer end portion 24 unlined by the tubular body 5. After the wall tie has been inserted into the wall the plunger 6 is driven inwards until it is flush with the end of the adjacent guide tube 7 as shown in FIG. 2. This causes the dog plates 13 and 15 of each of the gripper sub-assemblies 9 and 10 to project through the openings 11 and dig into the surface of the hole in the wall so that the leaves 21 and 22 are tied one to the other. As indicated in FIG. 2 in this position of the plunger the inclined portions 20 have passed right through the plates 12 to 16 and the apertures 19 in those plates are occupied by the full cross-section of the plunger. There is thus no force tending to move the plunger 5 outwards again. After installation of the wall-tie the outer end portion 24 of the hole is filled with mortar or mastic to cover and protect the exposed end of the wall-tie.

It will be appreciated that the wall tie according to the invention can be fitted by a rapid succession of operations; drilling the hole in the wall, inserting the wall-tie, driving in the plunger to secure it and covering the outer end of the hole. Access to the installation position is therefore required for only a short period and this can be an advantage in the provision of scaffolding or other means of access.

In a first modification of the embodiment of FIGS. 1 to 4, the tubular body 5 is made from flat strip material curved transversely into tubular form leaving a narrow axial slit between the longitudinal edges of the strip. The guide tubes 7 are also formed from flat material and are a close fit in the tubular body 5. The spring 8 is then unnecessary and is omitted. In the part of the tubular body 5 which is to lie within the cavity, a drain hole is pierced through the wall of the tubular body on the side opposite the axial slit. Further drain holes may be pierced through the wall on opposite sides of the tubular body and evenly angularly spaced from the one drain hole and the axial slit. A sealing washer of nylon or other suitable material is provided in the bore of the tube close to but axially inwards of the drain hole or holes, that is to say on the side of the drain hole away from the outer end of the plunger. The sealing washer fits the bore of the tubular body and has a central aperture complementary to the plunger on which it is a close sliding fit. At points on its periphery the sealing washer has radially projecting lugs which fit into the axial slit on the tubular body and the drain hole opposite the slit.

On installation, normally either the slit or the opposite drain hole should be upwards. If the slit is upward moisture from the outer leaf of the cavity wall on the outer surface of the tubular body 5 can flow along the slit until it reaches the sealing washer where the lug projecting into the slit acts as a stop and diverts the moisture across the face or around the periphery of the sealing washer to the drain hole through which it escapes. If moisture passes through the axial slit or otherwise gets into the bore of the tube it can escape through the drain hole. In either case the sealing washer acts as a barrier to prevent moisture from passing from the outer leaf to the inner leaf along the wall tie. If the drain hole is uppermost, the slit serves both to collect moisture flowing around the outside or inside of the tubular body and to allow it to drain away, the lug on the sealing washer forming a stop to the flow of moisture along the slit towards the inner leaf and a point at which moisture in the slit will be encouraged to drip and so escape from the wall tie.

If the two further drain holes are provided the angular position of the tubular body is less critical. On occasions, for example, to fit the wall tie in holes drilled in vertical courses of brickwork, it may be desired to fit the wall tie so that dog plates 13 and 15 project horizontally to engage brick material rather than mortar.

As previously mentioned, in some buildings one leaf, usually the inner leaf, of a cavity wall is made of breeze block or similar material which is softer than brick. The gripper sub-assembly 9 may not grip satisfactorily in such materials. In modified wall ties for use in these circumstances the inner ends of the wall ties are secured by resin. The gripper sub-assembly 9 and one or both the adjacent guide tubes 7 are omitted and holes or preferably longitudinal slots are pierced through the axially inner end portion of the wall of the tubular body 5. A frangible sachet of resin is fitted in the bore of the tubular body 5 in the space left beyond the end of the plunger 6 when the wall tie is in the pre-operative condition shown in FIG. 1. When the plunger is driven inwards, the sachet is burst by the plunger which also displaces the resin and forces it out through the holes pierced in the wall of the tubular body 5 into contact with the hole in the breeze block. Driving in the plunger 5 actuates the gripper sub-assembly 10 to secure the wall tie in the outer leaf 21. The setting of the resin also anchors the wall-tie in the inner leaf 22 so that no delay is involved in the fixing of the wall-tie. All the necessary work can be completed at one visit.

Further modifications may be made in the region of the inner end of the plunger 6 to assist in expressing the resin. For example, the end of the plunger 6 may be fitted with a washer or a plug be inserted in the bore of the tubular body 5 between the inner end of the plunger 6 and the sachet to act as a piston to force the resin through the holes or slots pierced in the walls of the tubular body 5. The washer or plug may be made of stainless steel or other metal or of plastics, nylon for example.

Figure 5:
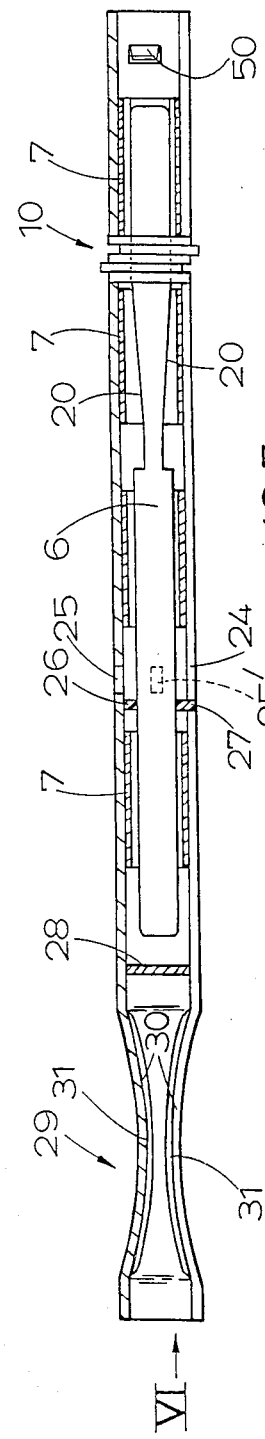
FIG. 5 is a view, similar to FIG. 2, of a modified wall tie.
Figure 6:
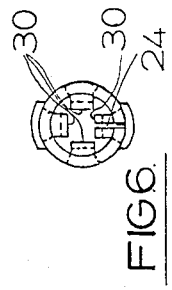
FIG. 6 is an end elevation of FIG. 5 in the direction of the arrow VI in FIG. 5.
Figure 7:
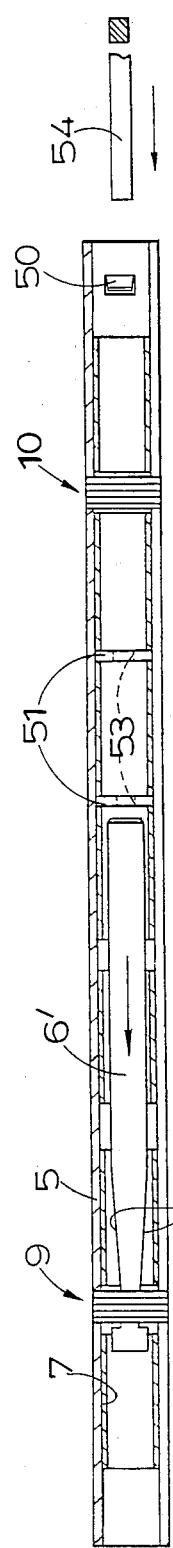
FIG. 7 is a view, similar to FIG. 1, of a further modified wall tie shown in a pre-operative condition.
Figure 8:
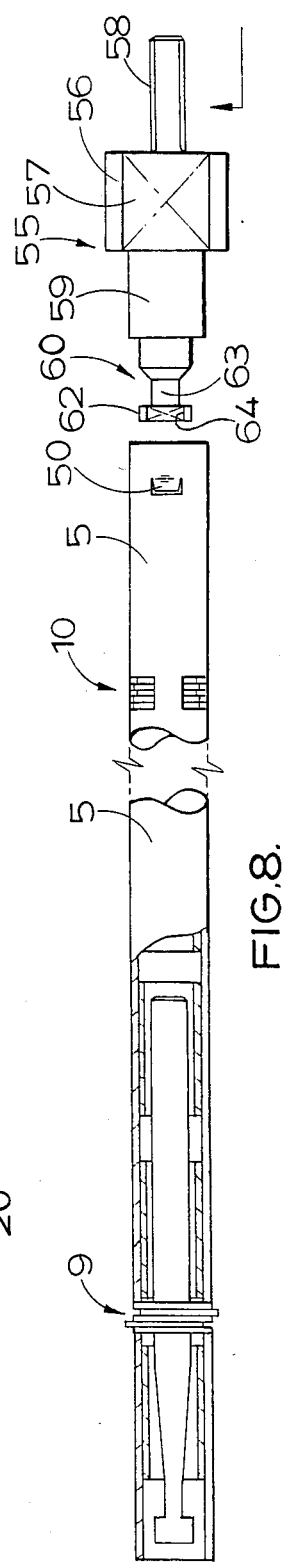
FIGS. 8 to 10 are similar views of the wall tie of FIG. 7 showing successive stages of operation towards a fully operative condition.

In the modified wall tie of FIGS. 5 and 6, components similar to those in FIGS. 1 to 4 bear similar reference numerals. Only one set of gripping means 10 is provided and the plunger 6 is shorter. This modified wall tie includes the structural and moisture draining feature already described in the modification of the embodiment of FIGS. 1 to 4. The tubular body 5 and the guide tubes 7 are formed from sheet material rolled into a tube leaving in the tubular body 5 an axial slit 24 between the edges of the strip. A drain hole 25 is pierced through the wall of the tubular body 5 opposite the slit 24. Further drain holes 25' are pierced through the wall on opposite sides of the tubular body and evenly angularly spaced from the drain hole 25 and the axial slit 24. Close to the inner side of the drain holes 25, 25' a nylon sealing washer 26 is fitted in the bore of the tubular body 5. A lug 27 on the sealing washer 26 engages the slit 24. The sealing washer 26 has a central aperture complementary to the cross-section of the plunger 6 which in this embodiment is made from flat strip (rather than square cross-section material) the inclined portions 20 being formed in the narrower edges of the plunger 6. The plunger 6 is long enough to remain in engagement with the sealing washer 26 in the pre-operative condition similar to that illustrated in FIG. 1 but does not have the inner set of inclined portions 20 of FIG. 1. As illustrated, the guide tubes, for convenience in manufacture, are all of similar length and some do not occupy the full, axial dimensions between other components. To hold the guide tubes 7 and other small components in position during assembly O-rings may be fitted around the plunger on each side of the component or sub-assembly of components which is to be located. Beyond the inner end of the plunger in the operative condition shown in FIG. 5, a nylon disc 28 closes the bore of the tubular body 5.

The inner end of the tubular body is provided with a formation 29 affording a satisfactory key between the tubular body 5 and resin in the blind hole in the inner leaf of the wall. Angularly spaced, narrow, longitudinal strips 30 are formed and separated from one another by piercing rectangular slots forming windows 31 through the material of which the tubular body is made. The strips 30 and the windows 31 extend from near the inner end of the tubular body 5 nearly to the disc 28. The strips 30 are bowed radially inwards until their edges at their mid-points meet or nearly meet. The shape of the initially rectangular windows 31 is altered by this operation so that each window 31 is closed or becomes very narrow at the middle and widens from there into generally triangular-shaped ends. The whole inner end of the tube is given a waisted form leaving substantially local clearance between the strips 30 and the surface of the hole in the wall into which the wall tie is fitted.

Resin injected into the blind hole in the inner leaf of the wall before the wall-tie is put in will, on insertion of the wall-tie, flow through the windows 31 enveloping the whole of the inner end of the tubular body 5 in resin. When the resin has set, the formation 29 affords a very good key between the resin and the wall-tie. The disc 28 prevents the liquid resin from flowing along the bore of the tubular body 5 and acts as a piston urging the resin through the windows 31.

Instead of the resin being injected into the blind hole of the inner leaf of the wall, it may be provided in a frangible capsule an end of which is fitted into the inner end of the wall tie before insertion. The capsule projects axially from the wall-tie and is fractured by being compressed between the blind end of the hole and the end of tubular body on insertion of the wall-tie. Alternatively the capsule of resin may be fitted during manufacture of the wall-tie into the bore of the tubular body 5 between the end of the plunger 6, which may then be shorter than illustrated in FIG. 5, and the formation 29, the sealing washer then being omitted or perforated.

In the embodiment of FIGS. 7 to 10 provision is made for securing gripping means in one leaf of a cavity wall and then independently securing gripping means in the other leaf. Components similar to those in FIGS. 1 to 4 again bear similar reference numerals.

The tubular body 5 is made, as previously described, from flat strip material curved transversely into tubular form having a narrow axial slit between the longitudinal edges of the strip. The guide tubes 7 are also formed from flat material and are a close fit in the tubular body 5. They are of equal length but varied spacing along the axis of the tubular body 5. If desired O-rings may be fitted around the plunger, as described in relation to the embodiment of FIGS. 5 and 6, to hold certain of the guide tubes 7 and other small components in place during assembly of the wall tie. Three of the guide tubes 7 abut discs 51 which will be further described below. The gripper sub-assemblies 9,10 are similar to those of FIGS. 1 to 4.

Instead of a single plunger two separate co-axial plungers 6',6" having inclined portions 20 for operating the sub-assemblies 9 and 10 respectively. On initial assembly of the wall tie only the inner plunger 6' is included. The outer plunger 6" has at its inner end a probe 52 of uniform rectangular cross-section equal to that at the smaller end of the inclined portions 20 of the outer plunger 6". The probe 52 has a pointed inner end to assist its insertion into the wall tie when required. The discs 51 have central holes 53 complementary to the cross-section of the probe 52, which engages the holes 53 to guide and support the plunger 6".

The wall tie of FIGS. 7 to 10 is intended for use in a hole drilled through one leaf of a cavity wall and part way through the other leaf in which it forms a blind hole as described in connection with the embodiment of FIGS. 1 to 4. The wall tie is inserted into the hole in the wall while the inner plunger 6' is in the position shown in FIG. 7 and the gripper means 9 is contracted. A drift 54 with a cross-section similar to the probe 52 is inserted through the gripper means 10 and the holes 53. The drift is long enough to reach the outer end of the inner plunger 6' and with its outer end projecting from the face of the wall so that it can be struck by a hammer to drive in the plunger 6' and operate the gripping means 9 to grip the blind hole in the one leaf of the wall. The plunger 6' is driven in until the parallel portion outward of the inclined portions 20 has entered the apertures in the plates of the gripping means 9 which are thereby locked in the extended condition. The drift 54 is then withdrawn.

The outer end of the tubular body 5 is provided with inwardly projecting lugs 50 as in the previous embodiments. If it is required to test the grip of the gripping means 9 before proceeding further with the fixing of the wall tie, an adaptor 55 (FIG. 8) is used to enable the testing device to be connected.

The adaptor 55 has a body portion 56 which is cylindrical but has an opposed pair of flats 57 for engagement by a spanner. A shank 58 with a 6 mm metric thread to suit the internally threaded socket of a standard testing device projects axially from one side of the body portion 56. Adjacent the other side of the body portion 56 is a cylindrical portion 59 the diameter of which is no larger than the outside diameter of the tubular body 5 so that it will enter the end of the hole in the wall in which the wall tie is installed and abut the outer end of the tubular body 5. Beyond the portion 59 a spigot 60 extends axially. Next to the portion 59 the spigot has a cylindrical portion 61 with a diameter to fit easily into the bore of the tubular body 5. At its free end the spigot has a head 62 joined to the portion 61 by a neck 63. The head is mainly cylindrical with a diameter to fit easily into the bore of the tubular body 5 but has a pair of diametrally opposed gaps 64 which when aligned with the lugs 50 will allow the head 62 to pass. The adaptor is then turned in the bore of the tubular body through about a right angle to bring the lugs 50 behind the full diameter portions of the head 62 locking the adaptor to the wall tie. The adaptor 55 enables the testing device to exert a pull on the wall tie. The tension applied can be measured by the testing device to show that the grip of the gripping means 9 is within prescribed limits.

Figure 9:
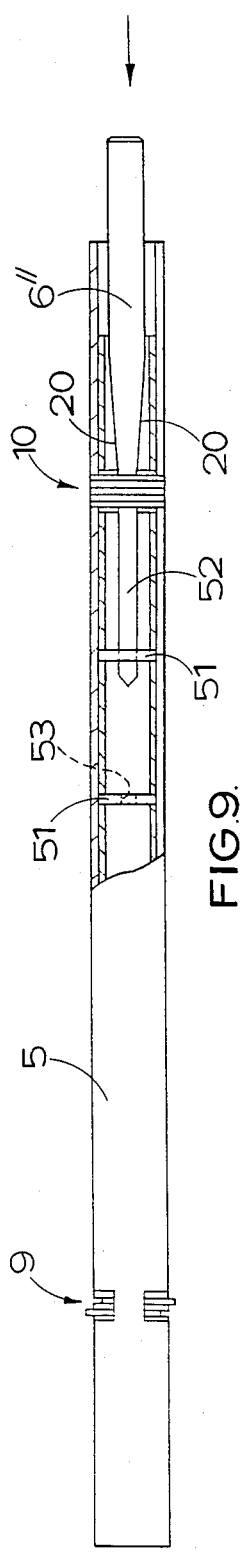
Figure 10:
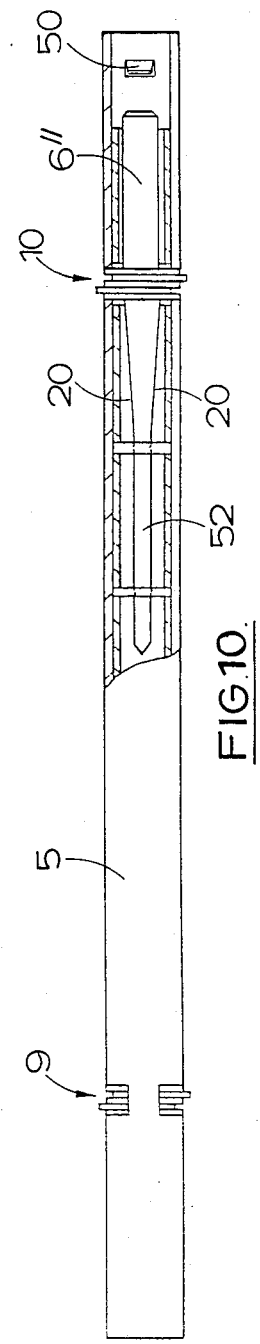

On completion of this test the adaptor 55 is removed and the outer plunger 6" inserted as shown in FIG. 9 and driven in to operate the gripping means 10. As shown in FIG. 10 when the outer plunger 6" is driven fully in its outer end is recessed in the outer end of the tubular body 5 leaving the lugs 50 clear so that the adaptor 55 can be re-inserted and the grip of the wall tie tested again, if required.

Features of the various embodiments described may be included in wall ties in different combinations. For example, provision for draining moisture and preventing it from reaching the inner leaf of a cavity wall may be made as described in the first modification of FIGS. 1 to 4 or in the embodiment of FIGS. 5 and 6. As another example of a re-combination of features, in the embodiment of FIGS. 7 to 10 the gripping means 10 may be replaced by a waisted portion similar to the waisted portion 29 of FIG. 5 to enable the wall tie to be secured by synthetic resin in the outer leaf of a cavity wall. Provision for covering or plugging the holes 53 would be made for insertion after withdrawal of the drift 54 to confine the resin to the waisted portion of the tubular body.

Again, a wall tie may be formed with a waisted portion like the waisted portion 29 of FIG. 5 instead of each of the gripping means 9,10.

Although the wall ties illustrated in the drawings are all intended for cavity walls, their features in a variety of combinations may be used in generally similar anchoring devices for securing together structural components, with or without a gap between them, for example, for securing cladding panels to the face of a wall of a building, as by drilling a hole for the anchoring device through the cladding and part way into the wall, inserting and securing the anchoring device and plugging the exposed hole in the cladding.

I claim.

1. An anchoring device adapted to be fitted in a hole drilled in a structure to which the device is to be secured comprising an elongate tubular body, a plunger axially movable in the bore of the tubular body and having at least one inclined portion engageable with gripping means comprising transverse dogs disposed in openings in the wall of the tubular body, the dogs being metal plates sandwiched between metal guide plates of which at least the outer ones are supported in the openings in the wall of the tubular body, the arrangement being such that, in use, after fitting the anchoring device in the hole axial movement of the plunger causes the dogs to project through the openings in the wall of the tubular body to grip the surface of the hole.

2. An anchoring device according to claim 1 wherein both the dog plates and guide plates have apertures to allow the plunger through, the apertures in the dog plates being eccentric.

3. An anchoring device according to claim 1 wherein there are inclined portions on opposite sides of the plunger which is thus of tapered form in this region, each inclined portion having associated with it at least one of the dog plates which on axial movement of the plunger, is adapted to be caused to project through that opening towards which the associated inclined portion faces.

4. An anchoring device according to claim 1 wherein the gripping means is operable by inward movement of the plunger.

5. An anchoring device according to claim 1 wherein gripping means is provided at each end of the tubular body to secure the device as a wall tie in aligned holes in inner and outer leaves of a cavity wall.

6. An anchoring device according to claim 5 wherein both gripping means are operable by a single plunger.

7. An anchoring device according to claim 1 wherein the outer end of the tubular body is provided with means for releasably connecting a testing device for testing the grip of the anchoring device in the structure or an adaptor for coupling such a testing device to the anchoring device.

8. An anchoring device according to claim 1, to be fitted in aligned holes in elements of a structure to secure said elements together and comprising means for securing the device in each element, the means for securing the device in at least one element being said gripping means.

9. An anchoring device according to claim 8 wherein the anchoring device is in the form of a wall tie and the structural elements are inner and outer leaves of a cavity wall.

10. An anchoring device adapted to be fitted in a hole drilled in a structure to which the device is to be secured comprising an elongate tubular body, inner and outer gripping means at opposite ends of the tubular body to secure the device as a wall tie in aligned holes in inner and outer leaves of a cavity wall, inner and outer plungers axially movable in the bore of the tubular body, the inner plunger being operably connected to the inner gripping means and the outer plunger being operably connectible to the outer gripping means, the arrangement being such that, in use, after fitting the anchoring device in the hole, axial movement of the plungers causes the associated gripping means to project laterally from the wall of the tubular body to grip the surface of the hole.

11. An anchoring device according to claim 10 wherein the inner and outer plungers are co-axial.

12. An anchoring device according to claim 1 wherein the outer end of the tubular body is provided with means for releasably connecting a testing device for testing the grip of the anchoring device in the structure or an adaptor for coupling such a testing device to the anchoring device.

13. An anchoring device according to claim 10 in combination with an adaptor for coupling the testing device to the anchoring device wherein the anchoring device and the adaptor are provided with interengaging formations for releasably coupling the adaptor and anchoring device.

14. A method of fitting an anchoring device according to claim 12 in the aligned holes in the inner and outer leaves, wherein initially the outer plunger is not assembled in the device, the method comprising the successive steps of inserting the device in the holes, moving the inner plunger inwards by means of a drift inserted through the outer end of the tubular body to operate the inner gripping means, testing the grip of the inner gripping means in the inner leaf, assembling the outer plunger in the device and moving the outer plunger inwards to operate the outer gripping means.

15. An anchoring device in the form of a wall tie to be fitted in aligned holes in inner and outer leaves of a cavity wall comprising an elongate tubular body, gripping means at one end of the tubular body, a plunger axially movable in the bore of the tubular body and operably connected to the gripping means to secure the device in one leaf and at the other end of the tubular body a windowed portion having apertures through the material of the tubular body, the windowed portion being contracted radially to form a waisted portion of the tubular body, the arrangement being such that, in use, on fitting the anchoring device in the hole substantial local clearance for synthetic resin is left between the windowed portion and the surface of the hole and axial movement of the plunger causes the gripping means to project laterally from the wall of the tubular body to grip the surface of the hole.

16. An anchoring device according to claim 15 wherein the windowed portion comprises angularly spaced, narrow longitudinal strips separated by slots forming windows through the tubular body, the strips being bowed radially inwards to form the waisted portion of the tubular body.

17. An anchoring device according to claim 15 wherein the outer end of the tubular body is provided with means for releasably connecting a testing device for testing the grip of the anchoring device in the structure or an adaptor for coupling such a testing device to the anchoring device.

18. A wall tie to be fitted in aligned holes in inner and outer leaves of a cavity wall and adapted in use to secure said leaves one to the other across the cavity comprising an elongate tubular body having end portions axially separated by a medial portion having a plain axially continuous cylindrical surface, means confined to said end portions for securing said wall tie in each leaf, the means for securing the wall tie in at least one leaf being gripping means, a plunger or plungers mounted for axial movement in the bore of the tubular body and operably connected to said gripping means in such a way that axial movement of the or each plunger causes the associated gripping means to project laterally from the wall of said end portions of the tubular body, said medial portion being free from external laterally projecting or projectible portions.

19. A wall tie according to claim 18 wherein said plunger has at least one inclined portion and the or each said gripping means comprises at least one transverse dog disposed in an opening in the wall of an associated one of said end portions of said tubular body, said inclined portion engaging said dog to cause said dog to project through said opening on axial movement of said plunger.

20. A wall tie according to claim 18 wherein said means for securing said wall tie in each leaf comprises gripping means in each of said end portions, each gripping means being operable by said plunger or one of said plungers.

21. The combination of a structure which is a cavity wall having inner and outer leaves separated by a cavity, an anchoring device in the form of a wall tie fitted in aligned holes in said inner and outer leaves and so as to bridge the cavity, and synthetic resin in the holes securing the anchoring device in the holes in the structure, the anchoring device comprising a unitary elongate tubular body having for most of its length an outside diameter substantially that of the bore of the hole, but having windowed portions at each end of the tubular body, each windowed portion comprising angularly spaced, narrow longitudinal strips separated by slots forming windows through the tubular body, the strips being bowed radially inwards to form a waisted portion of the tubular body, substantial local clearance being left between each windowed portion and the surrounding surface of the hole for the synthetic resin.

22. The combination according to claim 21 wherein the outer end of the tubular body of the anchoring device is provided with means for releasably connecting a testing device for testing the grip of the anchoring device in the structure or an adaptor for coupling such a testing device to the anchoring device.

23. A wall tie to be fitted in aligned holes in inner and outer leaves of a cavity wall and adapted in use to secure said leaves one to the other across the cavity comprising an elongate tubular body having end portions axially separated by a medial portion having a plain axially continuous cylindrical surface, means confined to said end portions for securing the wall tie in each leaf, said securing means at each end of the tubular body including a windowed portion having apertures through the material of the end portion, each windowed portion comprising angularly spaced, narrow longitudinal strips separated by slots forming windows through the tubular body, the strips being bowed radially inwards to form a waisted portion of the tubular body, the arrangement being such that in use on fitting the wall tie in the aligned holes substantial local clearance for synthetic resin is left between each waisted portion and the surface of the associated hole.

24. A wall tie according to claim 23 wherein the outer end of the tubular body is provided with means for releasably connecting a testing device for testing the grip of the wall tie in the structure or an adaptor for coupling such a testing device to the anchoring device.

* * * * *